United States Patent Office 2,760,854
Patented Aug. 28, 1956

2,760,854

DEFOLIATION OF PLANTS

William A. La Lande, Jr., Plymouth Meeting, Pa., assignor to The Pennsylvania Salt Manufacturing Company, Philadelphia, Pa., a corporation of Pennsylvania No Drawing. Application May 14, 1951,
Serial No. 226,287

7 Claims. (Cl. 71—2.2)

This invention relates to defoliation of plants without injury to parts other than the foliage, especially to defoliation of plants bearing crops above ground, as an aid to harvest of the crops.

Defoliation of plants in the field by chemical means involves chemical stimulation of the natural plant processes which induce the plant to cut off (abscise) its leaves. The process of abscission involves the growth of cells in a so-called abscission layer, usually at the base of the leaf stalk, where it joins the branch or stem, accompanied by the process of dissolving or splitting away of the plant structure within this abscission zone. Since leaf abscission is natural in the mature or senescent plant, the chemical that accelerates leaf abscission in a sense accelerates senescence and the action on the plant has some of the characteristics of plant injury. But it is clear that not all chemicals that injure the leaves or other portions of the plant are effective defoliants, since it is no help that the leaf wither and die without stimulation of growth of cells in the abscission layer and the solution or disruption of the structure in this layer having also taken place. As stated in the Fourth Annual Report of the National Cotton Council "too much injury may kill the tissues in the abscission zone and prevent the vital processes needed for defoliation. Conversely, too little may fail to bring about sufficient activation."

In the case of the plant bearing a crop above ground, which is to be harvested, it is equally clear that the chemical defoliant must not be one that injures the crop, causes the plant to abscise its crop, or cause the whole plant to wilt and fall to the ground. Hence, successful defoliation of a crop-bearing plant involves a selective action on certain plant processes (in part stimulative, in part destructive) without adverse effect on the many other plant processes.

Similarly, in the case of nursery stock such as roses, hawthorn, holly, viburnum, hydrangea, and fruit trees, there is a growing need for chemically induced defoliation, without injury to buds or other parts of the plants, to prepare the stock for transplanting or storage during periods when the natural plant processes would make this undesirable. As stated by A. M. S. Pridham, "The problem of defoliating nursery stock is more than one of removal of the foliage. Artificial methods of defoliation must not disfigure the bark or break the twigs or buds. Treatments should not make the nursery stock unduly subject to winter injury nor should the appearance of the new foliage be abnormal . . ."

In fact, a beneficial effect on certain plant processes is often sought in connection with defoliation in the case of crop-bearing plants. One of the purposes in defoliating soybeans, for example, is to accelerate the maturing of the bean so that it may be harvested before the wet season. In addition, the threshing of the bean is, of course, simplified by eliminating the leaves through plant defoliation. Defoliation of cotton similarly, in the ideal situation, has the beneficial effect of accelerating the drying out and the opening of the bolls so that a greater proportion of these may be harvested at one time. Thus, non-phytocidal defoliation demands a remarkably selective action of the chemical agent on the plant processes, often more stimulative than destructive. This lack of destructive action is well illustrated by the new defoliant of this invention, hereinafter described, which has in some instances caused cotton plants to drop their leaves almost without noticeable injury to the leaf except for the abscission and, of course, without injury to the cotton bolls.

Obviously, the commercial herbicides would, for the most part, be unsuitable as non-phytocidal defoliants, since, if used in small enough quantity to avoid crop damage (or dormant bud damage in the case of nursery stock), there would be no assurance of leaf abscission even though leaf injury might occur. Pentachlorophenol, for example, or sodium chloropentaphenate are commonly used as herbicides. In attempting to use these as cotton plant defoliants, it was found that the chemical caused the leaves to shrivel but the leaves did not abscise, hence the cotton harvested by mechanical means contained considerable dry leaf trash which greatly reduced its quality.

Arsenites, fluosilicates, sodium trichloroacetate and sodium chloride (which have herbicidal action) similarly killed the leaves of cotton plants without causing them to fall off.

Other chemical herbicides, especially highly reactive materials (e. g. sulfuric acid), may defoliate under proper conditions but under the same conditions injure the crop or cause the whole plant to wilt.

I have now found that the water soluble chromates and dichromates, particularly alkali metal chromates and dichromates, are effective to defoliate plants without adverse effect on other plant processes and parts which it is desired to preserve (such defoliation is herein termed non-phytocidal defoliation). This new defoliant of my invention is particularly effective when used in admixture with a defoliant assistant as hereinafter defined and is especially effective for the defoliation of cotton and bean (e. g. soybean) plants.

In the practice of my invention the chromate, when used alone, may be applied at a rate ranging upwardly from 4 lbs. per acre. (The term "chromate" will be used herein to include both chromates and dichromates.) When the chromate is formulated with a defoliant assistant, as hereinafter discussed, the rate of application may in some cases be as low as 2 lbs. per acre, though at least 3 or 4 lbs. per acre would generally be preferable. The upper limit of application rate is subject to greater variation but I have found that it is generally desirable to use no more than about 20 lbs. per acre to avoid deterioration in crop quality. The chromate may be applied alone, but is more conveniently applied as a formulation, for example, in the form of an aqueous solution or in the form of a dust. The concentration of an aqueous solution may vary greatly, depending on the means of application. Solutions as dilute as one-half of one per-cent have been used whereas with some types of equipment it might be desirable to use an essentially saturated solution. When applied as a dust, the chromate in finely divided solid form may be blended with a finely divided inert carrier such as a clay of particle size 90 per-cent through 200 mesh. The distribution on the carrier may be accomplished by blending the finely divided solids or by impregnating the carrier with a solution of the chromate followed by volatilization of the solvent.

The defoliant assistant above referred to may assist the defoliant action in one or more of several ways. For example, plant growth inhibitors like maleic hydrazide or pentachlorobenzoic acid greatly assist in the preparation of the plant for harvest by inhibiting new growth during and after the defoliation action. Particular carriers like the finely divided clays, especially a clay such as attapulgite, have been found to increase the availability of the defoliant agent to the plant tissues. Ammonium sulphate has been found to assist the defoliant action of my chromate defoliant, making a smaller quantity of chromate necessary, as shown in some of the examples. Surface active materials may act as assistants for my chromate defoliants by aiding the wetting and penetration of the leaf; examples of suitable surface active agents include the alkyl aryl sulfonates, the polyglycol ethers, the alkyl sulfates, and the sulfosuccinic esters. Other assistants include stickers such as finely divided resinous materials for incorporation in my dust formulations, and thickeners such as polyvinyl alcohol or polyacrylic acid for incorporation in liquid formulations of my chromate defoliant.

The following examples are illustrative of my invention:

Example 1

The agents tabulated below, in aqueous solution of the concentration indicated, were applied to the cotton plants at a rate equivalent to about 100 gallons of solution per acre. The rate of application in pounds per acre may be taken as approximately eight pounds per acre in the case of the 1 per cent concentration and about four pounds per acre in the case of the 0.5 per cent concentration. The per cent defoliation was estimated ten days after application.

| Agent | Concentration (Wt. percent) | Percent Defoliation |
|---|---|---|
| Sodium dichromate | 1.0 | 98 |
| Ammonium dichromate | 1.0 | 95 |
| Do | 0.5 | 80 |

In other tests, agents such as ferric dichromate, sodium chromate, and calcium chromate were found to have similar defoliant action although not as effective for a given rate of application as ammonium dichromate and sodium dichromate.

Example 2

In comparative tests to show the effect of ammonium sulfate as a defoliant assistant with my new defoliant, cotton plants were sprayed with an aqueous solution of 1 per cent sodium chromate in one test and an aqueous solution containing 1 per cent sodium chromate and 4 per cent sodium sulfate in a parallel test, all conditions being identical except for the presence of the ammonium sulfate in the second solution. The solution containing sodium chromate alone gave 33 per cent defoliation whereas the solution containing the ammonium sulfate gave 100 per cent defoliation.

Example 3

In comparative tests to show the advantage of a surface active agent as a defoliant assistant, cotton plants were sprayed with aqueous solutions of sodium dichromate of a .25 per cent concentration in one case and, in another case, an aqueous solution containing a .25 per cent sodium dichromate and .025 per cent of keryl benzene sodium sulfonate (the term "keryl" refers to alkyl groups derived from kerosene), all test conditions being identical except for the presence of the surface active agent in the second solution. Under the conditions employed, the sodium dichromate gave 23 per cent defoliation when used alone whereas in the presence of the surface active agent the defoliation was 42 per cent.

Example 4

To show the advantage of a growth inhibitor as a defoliant assistant, in comparative tests on cotton plants carried out under identical conditions except for the solutions employed, in one case the plants were sprayed with a 0.5 per cent solution of sodium dichromate, and in the other case with a 0.5 per cent solution of sodium dichromate which also contained 0.05 per cent pentachlorobenzoic acid. The sodium dichromate alone gave 66 per cent defoliation whereas the sodium dichromate containing the pentachlorobenzoic acid gave 81 per cent defoliation. The pentachlorobenzoic acid-containing solution was also advantageous in that there was no new leaf growth whereas there was subsequent growth of five leaves per plant when sodium dichromate alone was employed.

Example 5

Sodium dichromate in aqueous solution was applied to soybean plants at a rate equivalent to about two pounds per acre resulting in about 75 per cent defoliation three weeks after application.

Example 6

The agents shown in the tabulation below were applied to mature cotton plants in the field at the rate indicated. The extent of defoliation was estimated twenty-one days after application.

| Test No. | Agent | Rate of Application (Lb. per acre) | Degree of Defoliation, percent |
|---|---|---|---|
| 1 | Sodium dichromate<br>Ammonium sulfate | 3<br>12 | 50 |
| 2 | Sodium dichromate | 6 | 75 |
| 3 | Sodium dichromate<br>Ammonium sulfate | 6<br>12 | 90 |
| 4 | Sodium dichromate | 12 | 95 |
| 5 | Sodium dichromate<br>Ammonium sulfate | 12<br>12 | 98 |
| 6 | Potassium dichromate | 12 | 80 |
| 7 | Potassium dichromate<br>Ammonium sulfate | 6<br>12 | 75 |
| 8 | Sodium dichromate<br>Ammonium sulfate<br>Attapulgite | 12<br>48<br>60 | 90 |

The last of the above described formulations was applied as a dust. The others were applied in aqueous solution.

Defoliation of other plants, both crop-bearing plants and ornamental shrubs and trees (e. g., nursery stock) may be carried out as described in the above examples without adverse effect on other plant processes and parts which it is desired to preserve, e. g., the crop in the case of the crop-bearing plants, and dormant buds, bark, and essential structure in the case of ornamental plants.

In place of the chromates described in the above examples, other water-soluble chromates may be used, for example, zinc chromate, copper chromate, and other chromate and dichromate salts.

In place of or in addition to such defoliant assistants as the ammonium sulfate or the pentachlorobenzoic acid, or the Attapulgite of the above examples, defoliant formulas as described in the examples may include other plant growth inhibitors, e. g. maleic hydrazide, other carriers, e. g. talc, fuller's earth, pyrophyllite, bentonite, diatomaceous earth, gypsum, kieselguhr, kaolin, etc., and may include surface active agents, such as the long-chain alkyl benzene sulfonates, the polyglycol ethers, lauryl sulfate or other aryl sulfates, liquid formulations may contain thickeners, such as polyvinyl alcohol, or polyacrylic acid and dust formulations may contain stickers, such as finely divided resinous materials, e. g. sodium or potassium resinates, methyl cellulose, goulac, etc.

The term "alkali metal" as used in the claims includes ammonium, and as above mentioned the term "chromate" includes dichromate. The reference in the claims to the rate of application being "equivalent" to a stated number of pounds per acre is intended to define also the rate when only one or a few plants are treated (as in nursery work), the rate per plant being capable of calculation from the acre rate by assuming a normal spacing of such plants in an acre of planting.

The above description of the product and process of my invention is intended to be illustrative only and my invention is not to be limited thereby.

I claim:

1. The method of non-phytocidal defoliation of plants which comprises applying a soluble chromate to the plant foliage in which the rate of application ranges from the equivalent of 2 lbs. per acre to the equivalent of 20 lbs. per acre, calculated on the basis of a field of plants spaced at normal intervals.

2. The method of claim 1 in which the plants are crop-bearing plants.

3. The method of claim 1 in which the plants are cotton plants.

4. The method of claim 1 in which the plants are bean plants.

5. The method of claim 1 in which the chromate is an alkali metal chromate.

6. The method of claim 5 in which the plants are cotton plants.

7. The method of claim 5 in which the plants are bean plants.

References Cited in the file of this patent

UNITED STATES PATENTS

| | | |
|---|---|---|
| 2,368,275 | Torley | Jan. 30, 1945 |
| 2,435,676 | Fitzgerald et al. | Feb. 10, 1948 |
| 2,444,905 | Sexton | July 13, 1948 |

FOREIGN PATENTS

| | | |
|---|---|---|
| 10,342 of 1907 | Australia | Mar. 3, 1908 |